(12) United States Patent
Barnett et al.

(10) Patent No.: US 9,297,422 B2
(45) Date of Patent: Mar. 29, 2016

(54) COUPLING ELEMENT FOR TORQUE TRANSMISSION IN A GAS TURBINE ENGINE

(71) Applicants: Barry Barnett, Markham (CA); Phillipe Bonniere, Toronto (CA); Daniel Alecu, Toronto (CA)

(72) Inventors: Barry Barnett, Markham (CA); Phillipe Bonniere, Toronto (CA); Daniel Alecu, Toronto (CA)

(73) Assignee: PRATT & WHITNEY CANADA CORP., Longueuil, CA (US)

( * ) Notice: Subject to any disclaimer, the term of this patent is extended or adjusted under 35 U.S.C. 154(b) by 736 days.

(21) Appl. No.: 13/660,039

(22) Filed: Oct. 25, 2012

(65) Prior Publication Data

US 2014/0116061 A1 May 1, 2014

(51) Int. Cl.
*F16D 3/80* (2006.01)
*F02C 7/12* (2006.01)
*F16D 1/10* (2006.01)
*F01D 5/02* (2006.01)

(52) U.S. Cl.
CPC .............. *F16D 1/101* (2013.01); *F01D 5/026* (2013.01); *F05D 2260/20* (2013.01); *F16D 2001/103* (2013.01); *Y02T 50/675* (2013.01); *Y10T 403/25* (2015.01); *Y10T 464/10* (2015.01)

(58) Field of Classification Search
CPC ....... F01D 5/026; F05D 2260/20; F16D 1/101; F16D 2001/103
See application file for complete search history.

(56) References Cited

U.S. PATENT DOCUMENTS

| | | | |
|---|---|---|---|
| 2,964,926 A | | 11/1959 | Hoffman |
| 3,222,772 A | * | 12/1965 | Leyner ............................ 29/447 |
| 3,631,688 A | * | 1/1972 | Quick ........................... 464/182 |
| 3,900,270 A | * | 8/1975 | Rhodes ......................... 403/317 |
| 4,664,599 A | * | 5/1987 | Robbins et al. ........... 416/198 A |
| 4,919,562 A | | 4/1990 | Anthony et al. |
| 4,961,669 A | * | 10/1990 | Itoh et al. .................... 403/359.6 |
| 7,841,163 B2 | | 11/2010 | Welch et al. |
| 8,840,375 B2 | * | 9/2014 | Virkler .......................... 416/221 |
| 2012/0219351 A1 | * | 8/2012 | Besler et al. .................... 403/37 |
| 2013/0014513 A1 | * | 1/2013 | Barnett et al. ................... 60/772 |

* cited by examiner

*Primary Examiner* — Igor Kershteyn
(74) *Attorney, Agent, or Firm* — Norton Rose Fulbright Canada LLP

(57) ABSTRACT

A gas turbine engine having a coupling element for coupling a first shaft to a second shaft, the second shaft being substantially axially aligned with the first shaft, the coupling element provided with an exterior surface that engages an opposing interior surface of the first shaft and an interior surface that engages an opposing exterior surface of the second shaft to facilitate torque transfer between the first shaft and the second shaft when rotated together, wherein the coupling element and at least one of the first and second shafts cooperate to define at least one fluid passageway therebetween.

18 Claims, 9 Drawing Sheets

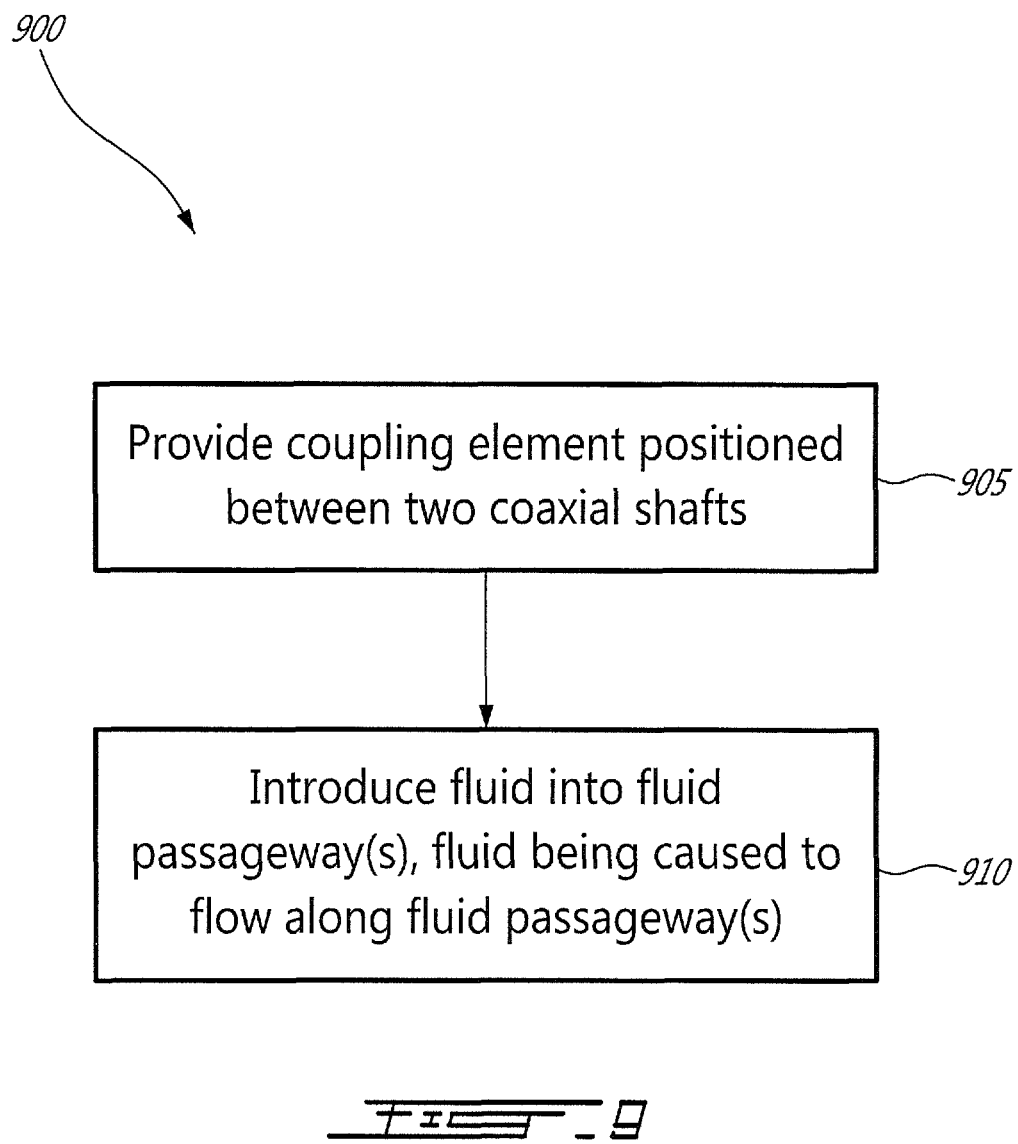

COUPLING ELEMENT FOR TORQUE TRANSMISSION IN A GAS TURBINE ENGINE

TECHNICAL FIELD

The disclosure relates generally to coupling element for transmission of torque, particularly in an aircraft engine.

BACKGROUND

In an engine, such as a turboshaft or turbofan aircraft engine, it may be desirable to transmit torque in a high temperature environment, such as at or near a rear-end cone of the engine (which may reach temperatures as high as 1500° F. or higher).

Polymer coupling elements have been used for transmitting torque from an engine in lower temperature environments, but because of melting point limitations of polymer materials, such coupling elements have been of limited use in high temperature regions of an engine.

SUMMARY

In some example aspects, the disclosure provides a gas turbine engine having a torque transmission system comprising: a transmission shaft substantially coaxially aligned with an engine shaft; and a coupling element including a first surface configured to engage a surface of the engine shaft, the coupling element also including a second surface configured to engage a surface of the transmission shaft, to facilitate transmission of torque between the engine shaft and the transmission shaft, the coupling element cooperating with at least one of the engine shaft and the transmission shaft to define at least one fluid passageway between the coupling element and the at least one of the engine shaft and the transmission shaft.

In some example aspects, the disclosure provides a gas turbine engine having a coupling element for coupling a first shaft to a second shaft, the second shaft being substantially axially aligned with the first shaft, the coupling element provided with an exterior surface that engages an opposing interior surface of the first shaft and an interior surface that engages an opposing exterior surface of the second shaft to facilitate torque transfer between the first shaft and the second shaft when rotated together, wherein the coupling element and at least one of the first and second shafts cooperate to define at least one fluid passageway therebetween.

In some example aspects, the disclosure provides a method of cooling a coupling element between two substantially axially aligned shafts in a gas turbine engine, the method comprising: providing the coupling element coaxially positioned between the two shafts, an exterior surface of the coupling element engaging an interior surface of a first of the two shafts and an interior surface of the coupling element engaging an exterior surface of a second of the two shafts, at least one fluid passageway being defined between the coupling element and at least one of the two shafts; and introducing fluid into an end of the at least one fluid passageway, the fluid being caused to centrifugally flow along the at least one fluid passageway due to rotation of the two shafts.

Further details of these and other aspects of the described embodiments will be apparent from the detailed description below.

BRIEF DESCRIPTION OF THE DRAWINGS

Reference is now made to the accompanying drawings, in which:

FIG. 9 shows a flowchart illustrating an example method for cooling a coupling element between two coaxial shafts.

DETAILED DESCRIPTION OF EMBODIMENTS

To provide a thorough understanding, various aspects and embodiments of machines according to the disclosure, including at least one preferred embodiment, are described with reference to the drawings.

Figure 1:
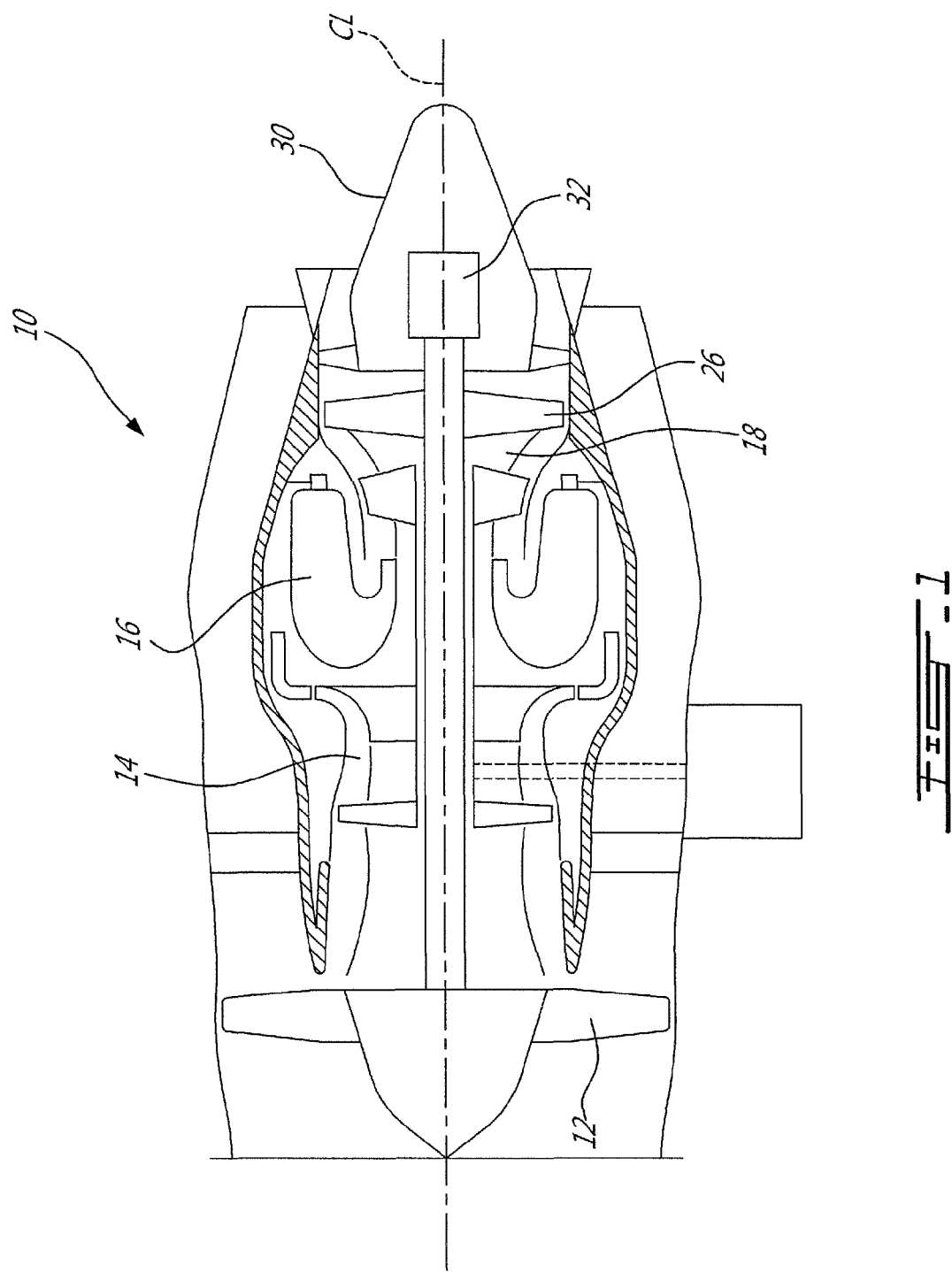
FIG. 1 shows an axial cross-sectional view of an example turbofan engine.
Figure 2:
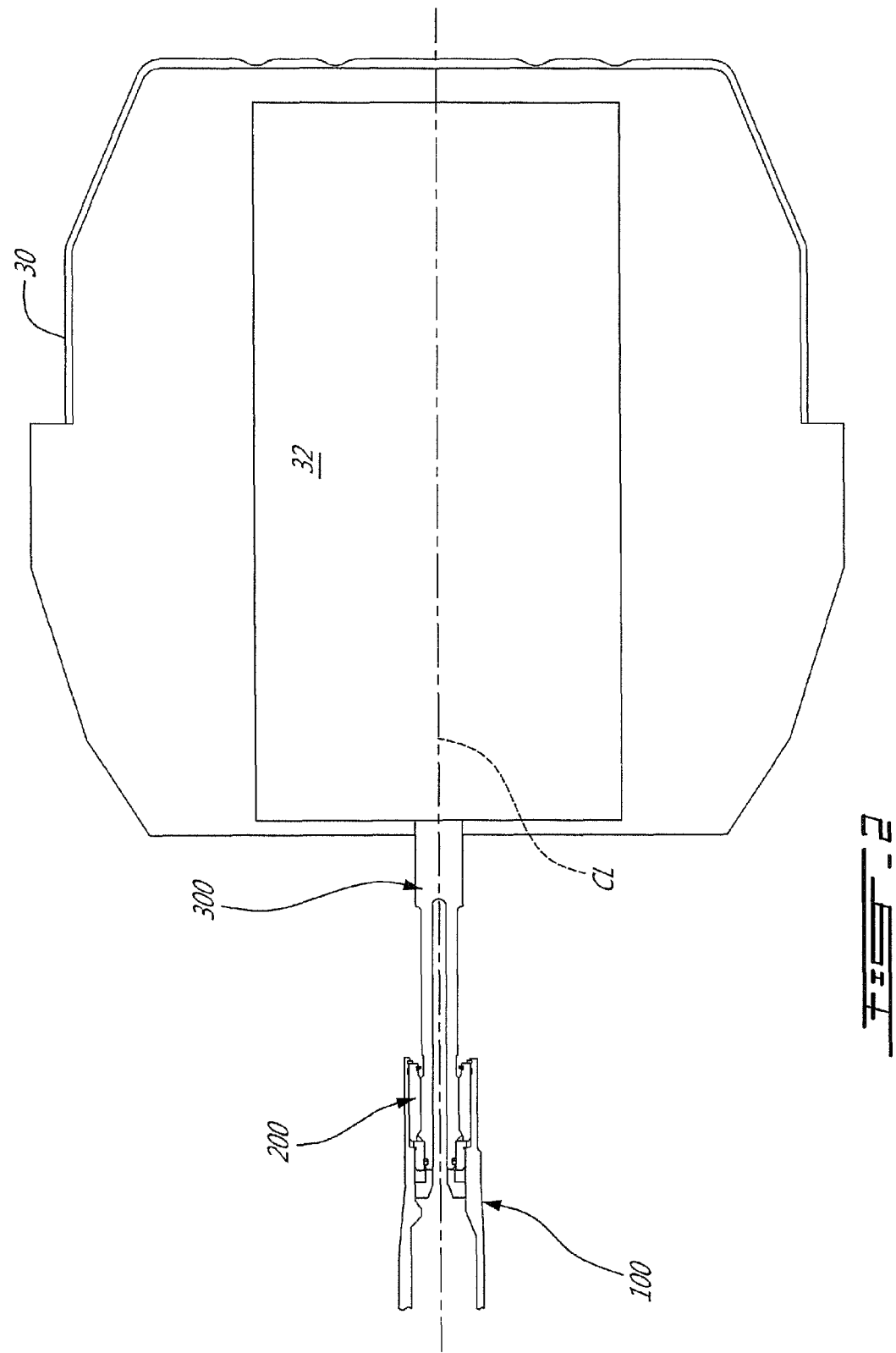
FIG. 2 shows a close-up axial cross-sectional view of a rear portion of the example turbofan engine of FIG. 1.
Figure 3:
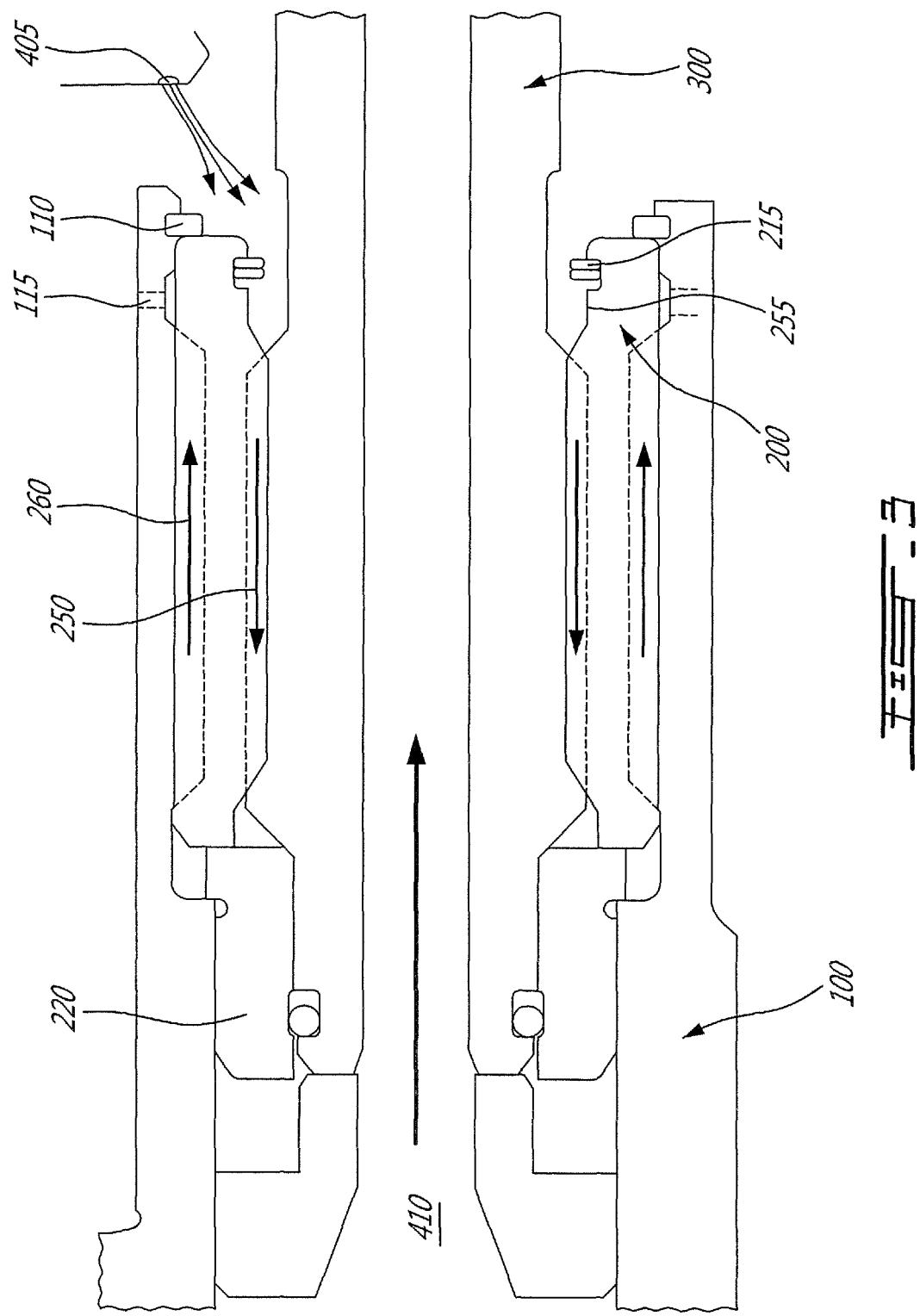
FIG. 3 shows an axial cross-sectional view of an example torque transmission system, including a coupling element suitable for transmitting torque between an engine shaft and a transmission shaft of the engine of FIG. 1.
Figure 4:
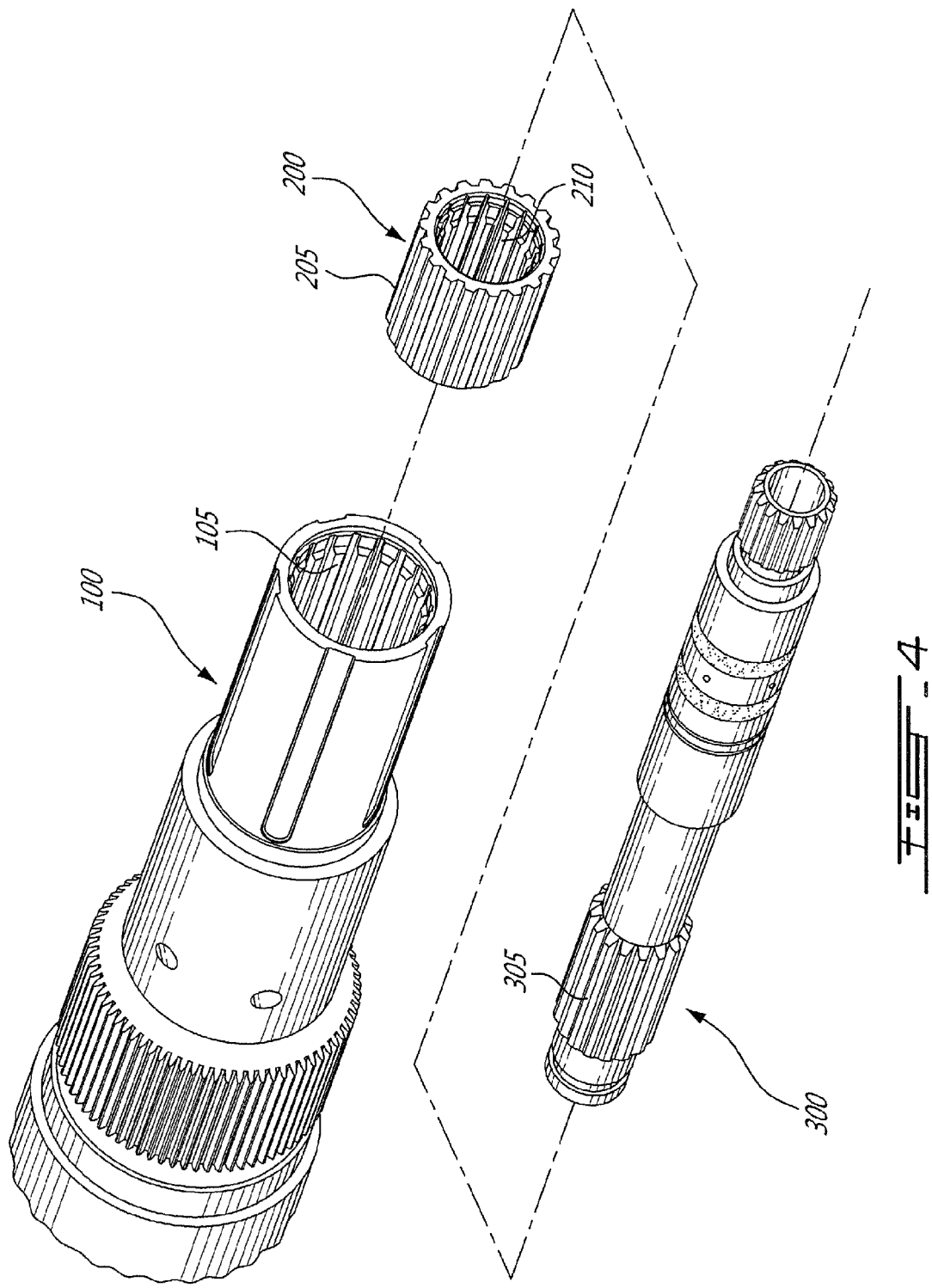
FIG. 4 shows an exploded view of the example torque transmission system of FIG. 3.
Figure 5:
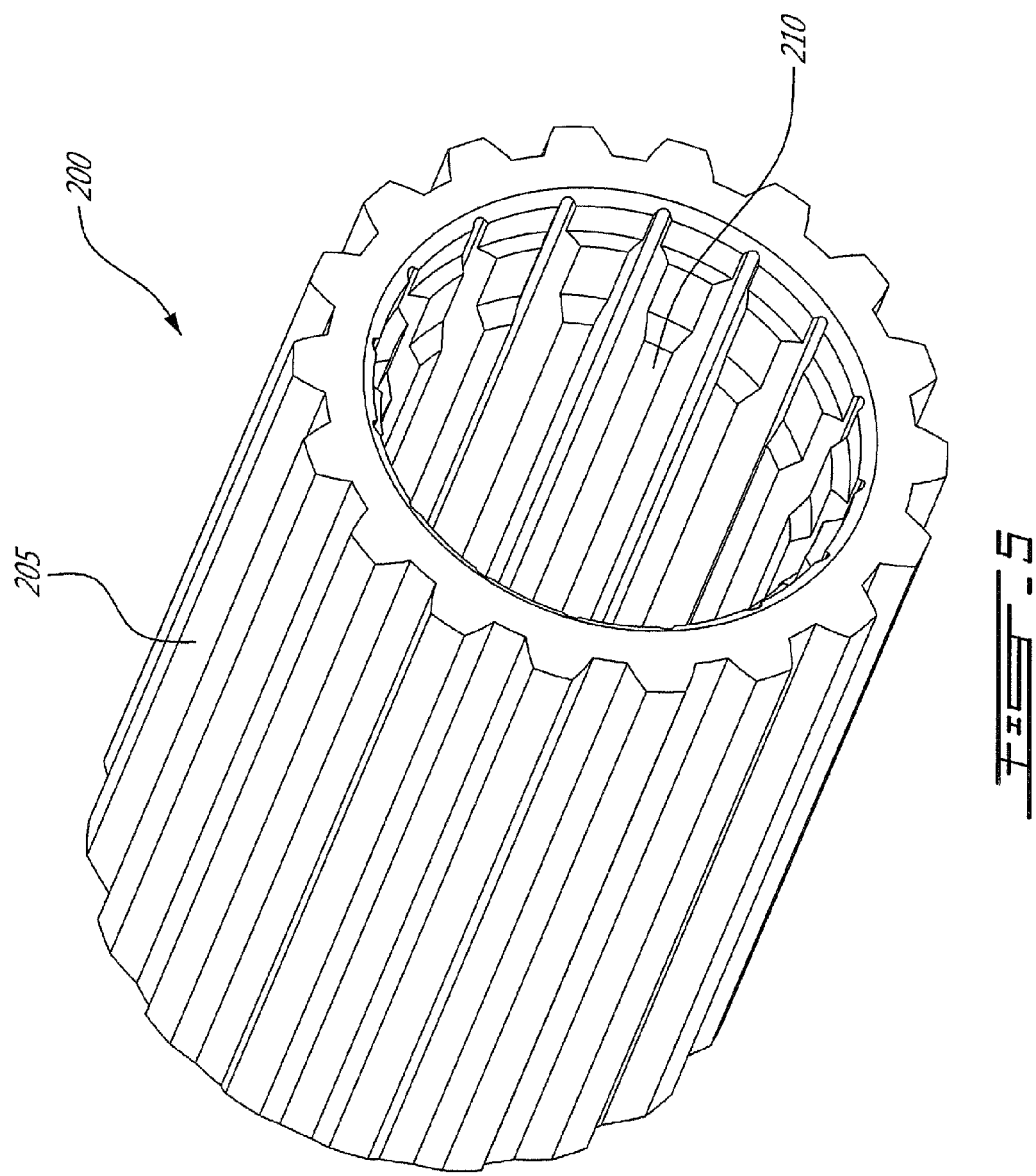
FIG. 5 shows an isometric view of the example coupling element of FIG. 4.

FIG. 1 illustrates an example gas turbine engine 10 of a type provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

A generator 32 may be mounted in a rear-end cone 30 of the engine 10. In order to transmit torque generated by the generator 32 to a low pressure spool 26, the shafts of these two components may be coupled together. As shown, the generator 32 and the low pressure spool 26 may share a common longitudinal axis CL. A direction towards the front of an aircraft when the engine 10 is mounted on the aircraft may be referred to as forwards or anterior, while the opposite direction (i.e., towards the back of the aircraft when the engine 10 is mounted on the aircraft) may be referred to as rearwards or posterior.

An example torque transmission system and its components are described with respect to FIGS. 2-8. In this example, the torque transmission system is shown as implemented in the engine 10. The system may include two shafts, in this example an engine shaft 100 (e.g., coupled to the low pressure spool 26) and a transmission shaft 300 (e.g., coupled to the generator 32), axially aligned or substantially aligned with each other, for example along a common longitudinal axis CL. The longitudinal axes of the shafts may be substantially parallel or co-linear (e.g., along common longitudinal axis CL). In the example shown, the transmission shaft 300 may be configured to partially fit inside the engine shaft 100.

The system may also include a coupling element 200 that may couple the engine shaft 100 with the transmission shaft 300 and allow torque about the common longitudinal axis CL to be transmitted between the shafts 100, 300. The coupling element 200 may be made of a compressible, resilient and/or flexible and/or electrically non-conductive material, such as a polymer material or any other suitable material. Using a compressible, resilient and/or flexible material may allow the coupling element 200 to adjust for any misalignment or shifting between the shafts 100, 300 (e.g., where the shafts 100, 300 do not share a common longitudinal axis). The coupling element 200 may be configured to fit against the inner surface of the engine shaft 100 and against the outer surface of the transmission shaft 300 and sharing the common longitudinal axis CL, such that, in cross-sectional view (e.g., in FIG. 6), the coupling element 200 and the shafts 100, 300 are substantially concentric.

For example, the engine shaft 100 may include an opening, recess or hollow at its posterior end into which the coupling element 200 may be accommodated (e.g., in an interference and/or interlocking fit). The coupling element 200 may similarly include an opening, recess or hollow into which an anterior end of the transmission shaft 300 may be accommodated (e.g., in an interference and/or interlocking fit). A fluid passageway 410 (e.g., an air passage) may be defined axially (e.g., along the common longitudinal axis CL) through each of the shafts 100, 300 and the coupling element 200, such that fluid (e.g., air) may flow axially through the torque transmission system. For example, the shaft(s) 100, 300 and/or the coupling element 200 may have a hollow, substantially cylindrical shape. Other geometries may be possible.

The exterior surface of the coupling element 200 may engage the interior surface of the engine shaft 100 (e.g., through one or more exterior splines 205 on the exterior of the coupling element 200 interlocking with complementary protrusions and/or indentations, such as one or more splines 105, on the interior of the engine shaft 100). Similarly, the interior surface of the coupling element 200 may engage the exterior of the transmission shaft 300 (e.g., through one or more interior splines 210 on the interior of the coupling element 200 engaging with complementary protrusions and/or indentations, such as one or more splines 305, on the exterior of the transmission shaft 300). Such engagement may be sufficient to facilitate at least partial transfer of torque between the transmission shaft 300 and the engine shaft 100, such as when at least one of the shafts 100, 300 is torqued about the longitudinal axis CL.

Although configured to facilitate transmission of torque between the shafts 100, 300, the torque transmission system may also be configured to allow flow of a coolant and/or lubricant (e.g., oil) around the coupling element 200, to avoid melting or thermal damage to the coupling element 200. Such cooling and/or lubrication may allow the coupling element 200 to be made of a compressible, resilient and/or flexible and/or electrically non-conductive material (e.g., a polymer material or any other suitable material), as described above.

Figure 6:
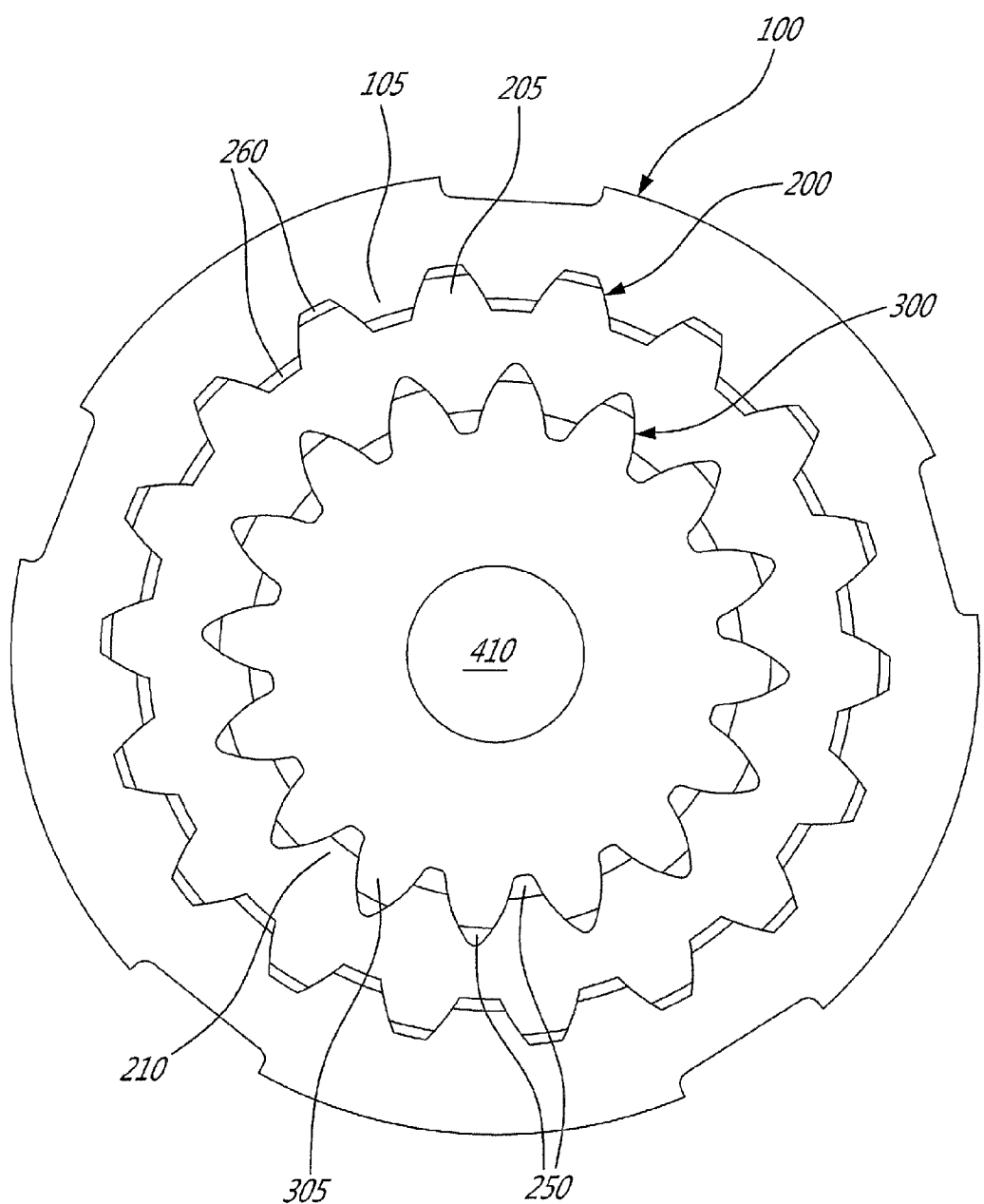
FIG. 6 shows a lateral cross-sectional view of the example torque transmission system of FIG. 3.
Figure 7:
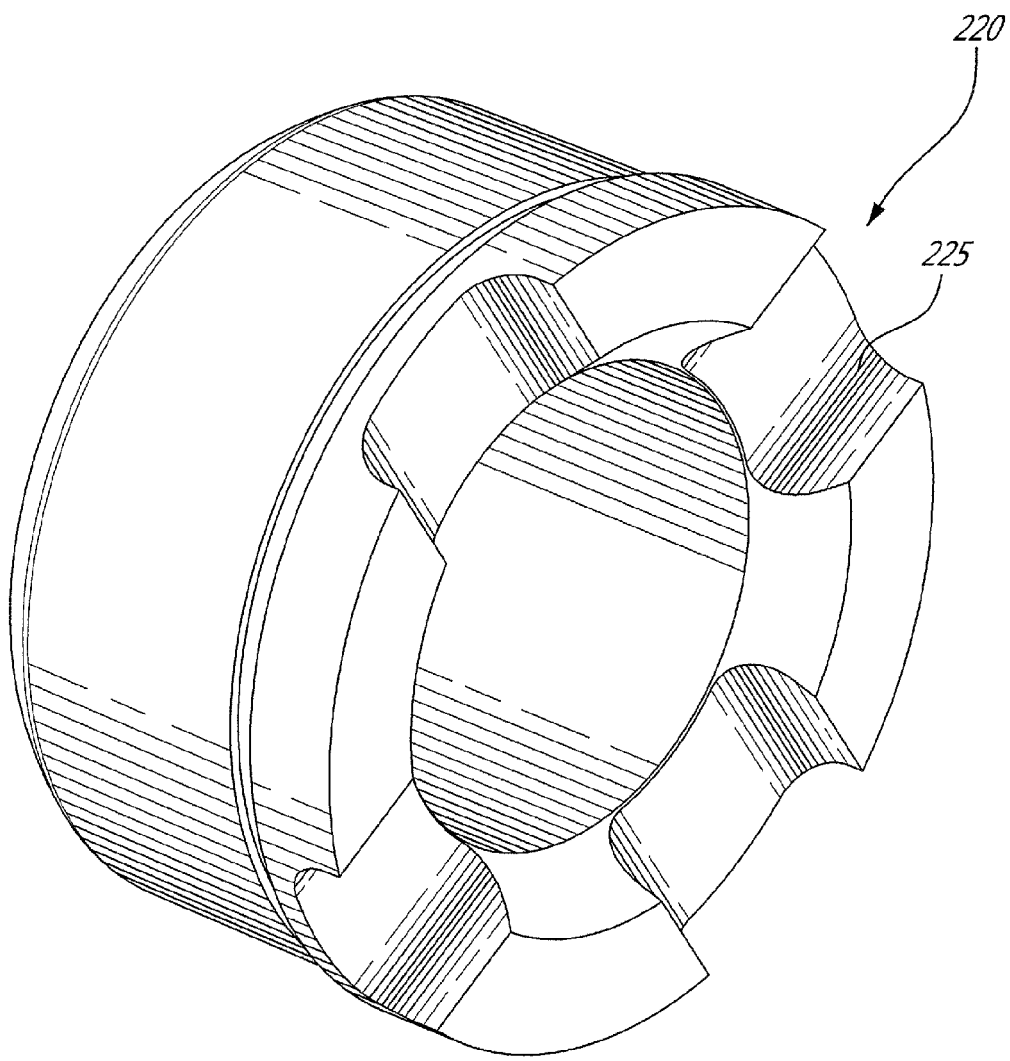
FIG. 7 shows an isometric view of an example fluid dam of the example torque transmission system of FIG. 3.
Figure 8:
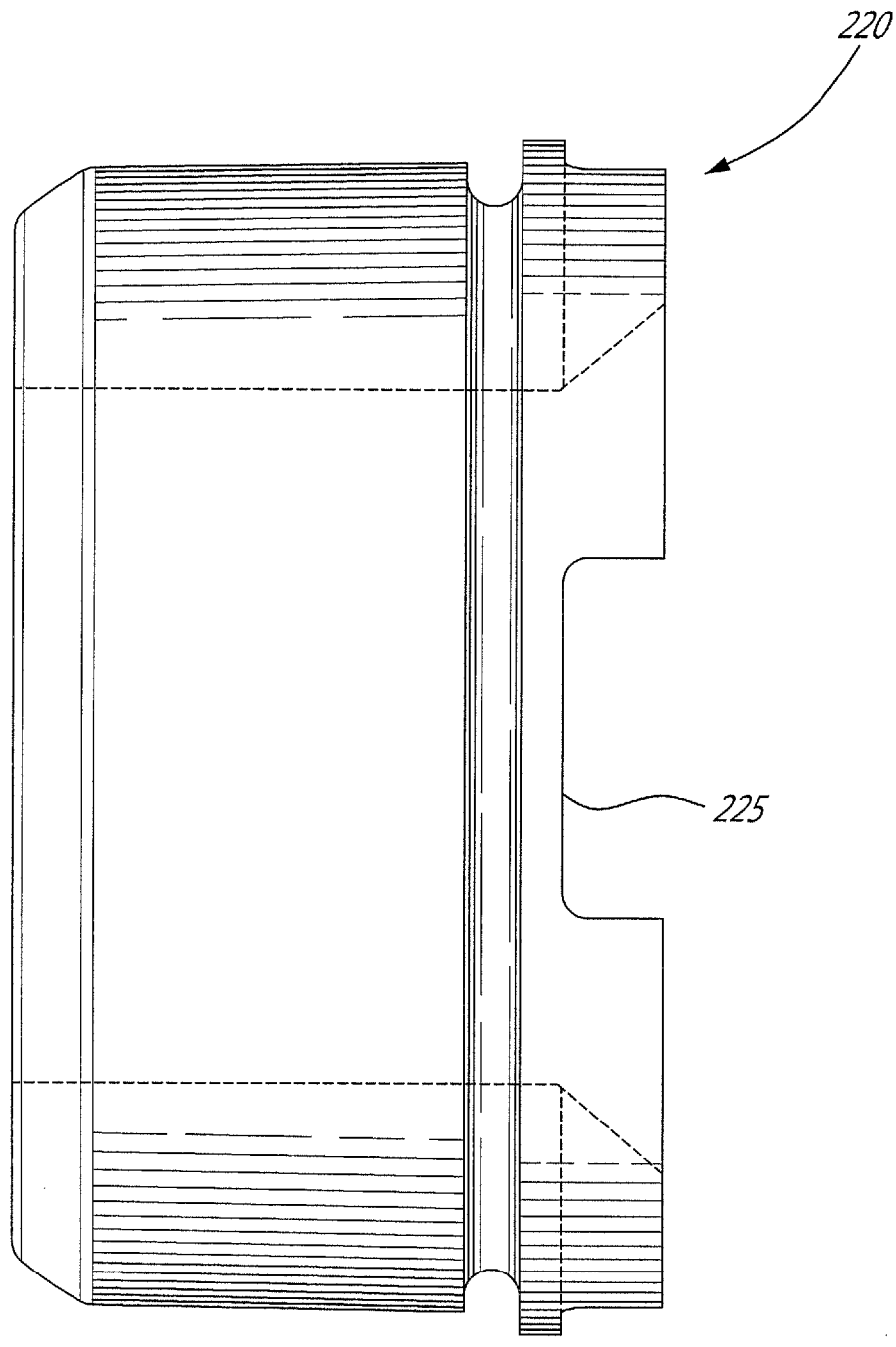
FIG. 8 shows an axial cross-sectional view of the example fluid dam of FIG. 7.

There may be at least one inner fluid passageway 250 defined between the coupling element 200 and the transmission shaft 300 (e.g., between the interior surface of the coupling element 200 and the exterior surface of the transmission shaft 300), to allow a coolant and/or lubricant to flow along an inner surface of the coupling element 200. For example, at least one interior spline 210 of the coupling element 200 and/or one or more complementary splines 305 of the transmission shaft 300 may be configured such that when the spline(s) 210 and spline(s) 305 are engaged with each other, a passageway 250 is defined between the tip of the coupling element spline 210 and the transmission shaft 300 and/or between the tip of the transmission shaft spline 305 and the coupling element 200. For example, as shown in FIG. 6, the spline(s) 305 and the spline(s) 210 may have a truncated shape, creating gaps between the coupling element 200 and the transmission shaft 300 that may serve as inner fluid passageway(s) 250.

Similarly, there may be at least one outer fluid passageway 260 defined between the coupling element 200 and the engine shaft 100 (e.g., between the exterior surface of the coupling element 200 and the interior surface of the engine shaft 100), to allow a coolant and/or lubricant to flow along an outer surface of the coupling element 200. For example, at least one exterior spline 205 of the coupling element 200 and/or one or more complementary splines 105 of the engine shaft 100 may be configured such that when the spline(s) 205 and spline(s) 105 are engaged with each other, a passageway 260 is defined between the tip of the coupling element spline 205 and the engine shaft 100 and/or between the tip of the engine shaft spline 105 and the coupling element 200. For example, as shown in FIG. 6, the spline(s) 105 and the spline(s) 205 may have a truncated shape, creating gaps between the coupling element 200 and the engine shaft 100 that may serve as outer fluid passageway(s) 260.

In some examples, the coupling element 200 may define a reservoir (e.g., an annular recess 255 that cooperates with a ring 215) for collecting fluid (e.g., oil) and for introducing the fluid into the inner fluid passageway(s) 250. The reservoir may be defined about the inner circumference of the coupling element 200, so that fluid may be evenly introduced into inner fluid passageways 250 spaced about the circumference of the coupling element 200.

Fluid, such as oil or other suitable cooling and/or lubricating fluid, may be introduced to the torque transmission system by a fluid source 405 (e.g., a nozzle), which may be located in near or remotely from the coupling element 200. The source 405 may be configured to direct fluid towards the coupling element 200, for example into the reservoir. Fluid jetted from the source 405 may be collected in the reservoir and, due to rotation of the shafts 100, 300, may centrifugally flow down the inner fluid passageway(s) 250 (e.g., anteriorly) thus cooling at least the interior of the coupling element 200 and the anterior end of the transmission shaft 300.

In some examples, the coupling element 200 may cooperate with another component (e.g., the shafts or an end piece, such as a fluid dam 220) to redirect fluid flow at the anterior end of the coupling element 200, after the fluid has flow through the inner fluid passageway(s) 250. In this example, a fluid dam 220 fitted on the end face of the coupling element 200 may define one or more recesses 225 that, together with the coupling element 200, form a space that collects fluid from the inner fluid passageway(s) 250 and redirects the fluid into the outer fluid passageway(s) 260 (e.g., facilitated by centrifugal flow of the fluid when the shafts 100, 300 are in rotation). The fluid dam 220 may seal the inner and outer fluid passageway(s) 250, 260 such that fluid does not leak out of the torque transmission system at the anterior end.

The fluid, after flowing through the inner fluid passageway(s) 250, may collect against the fluid dam 220 and be redirected to flow (e.g., posteriorly) into the outer fluid passageway(s) 260, cooling at least the exterior of the coupling element 200 and the posterior end of the engine shaft 100.

The torque transmission system may include an outlet 115 allowing fluid to leave the system. For example, one or more drain holes may be defined in the engine shaft 100 through which fluid in the outer fluid passageway(s) 260 may drain out. A seal 110 (e.g., a ring-shaped seal) seated in the engine shaft 100 may seal the outer fluid passageway(s) 260 against leakage from between the coupling element 200 and the engine shaft 100 at the posterior end of the coupling element 200, such that fluid may only drain from the outlet(s) 115. The outlet(s) 115 may be calibrated (e.g., sized and/or shaped) in order to meter the rate at which fluid may drain out, thereby metering the rate of fluid flow through the inner and/or outer fluid passageway(s) 250, 260. Such metering may be calibrated to maintain fluid coverage of the interior and exterior surfaces of the coupling element 200, to provide sufficient cooling and/or lubrication, even in cases where there may be brief interruptions of fluid supply (e.g., where fluid from the outlet(s) 115 may not be continuous).

FIG. 9 illustrates an example method 900 for cooling and/or lubricating a coupling element between two coaxial shafts. The method 900 may be used to cool an example of the disclosed coupling element 200, such as in an example of the disclosed torque transmission system, or any other suitable system. The method 900 may be carried out in an engine, such as an aircraft engine (e.g., turbofan or turboshaft engine).

At 905, a coupling element (e.g., the coupling element 200) may be provided coaxially positioned between two coaxial shafts (e.g., the shafts 100, 300). The exterior surface of the coupling element may engage an interior surface of a first of the two shafts, and an interior surface of the coupling element may engage an exterior surface of a second of the two shafts, for example as described above.

There may be at least one fluid passageway (e.g., the fluid passageway 250 and/or 260) defined between the coupling element and at least one of the two shafts.

At 910, a fluid (e.g., a coolant and/or lubricant, such as oil) may be introduced into an end (e.g., a posterior end) of the fluid passageway(s). Rotation of the two shafts may cause the fluid to centrifugally flow along the fluid passageway(s). The coupling element may thus be cooled and/or lubricated. Where there is at least one inner fluid passageway and at least one outer fluid passageway (e.g., as described above), the fluid may flow in one direction along the inner fluid passageway(s) and flow in a second opposing direction along the outer fluid passageway(s).

The coupling element 200 and torque transmission system disclosed herein may enable direct mobile coupling between two substantially co-axial shafts, such as an engine shaft 100 (e.g., a shaft of a low pressure spool 26) and a transmission shaft 300 (e.g., a shaft of a generator 32) of a turbofan engine 10. The coupling element 200 may be electrically non-conductive, to provide electrical insulation between the two shafts 100, 300, and may also be flexible, to facilitate torque transmission even where there is misalignment between the two shafts 100, 300. The disclosed coupling element 200 and torque transmission system may enable self-lubrication and/or cooling of the coupling element 200 by motion of the shafts 100, 300.

Although the fluid dam 220, the ring 215 and the seal 110 have been described as separate components, in some examples the fluid dam 200, the ring 215 and/or the seal 110 may be integral with the coupling element 200, the engine shaft 100 and/or the transmission shaft 300.

In some examples, some or all of the torque transmission system may be positioned within the bearing cavity (not shown) of the engine. Some or all of the torque transmission system may be positioned in any other suitable cavity, such as a separate dedicated cavity of the engine.

In some examples, the torque transmission system may be substantially sealed from the introduction of air bubbles into the cooling and/or lubricating fluid, for example by high air pressures exterior to the system. This may help to ensure continuous coverage of the coupling element 200 by the fluid.

Although the present disclosure describes the fluid first flowing anteriorly through the inner passageway(s) 250 and then flowing posteriorly through the outer passageway(s) 260, in other example configurations the fluid may first flow posteriorly through the inner passageway(s) 250 and then flow anteriorly through the outer passageway(s) 260 (e.g., where the fluid source 405, such as an oil nozzle, is configured to introduce fluid in a posterior direction into the inner passageway(s) 250). Other such variations may be possible.

The present disclosure may be suitable for use in aircraft engines, such as turboprop or turbo fan engines. The present disclosure may be suitable for any other application where it may be desirable to transmit torque through coaxial coupling of two or more shafts.

Although the disclosure describes implementation in high temperature environments, the disclosure may be useful in other environments, including cool temperature environments or other environments where lubrication is desirable. For example, the present disclosure may be applicable in situations in which conventional polymer couplers are used.

Although the disclosure describes oil as an example fluid, other fluids (e.g., other coolants and/or lubricants) may be used. For example, other fluids such as hydraulic fluid, fuel or water may be used depending on the application (e.g., hydraulic pump, fuel pump or water pump).

Although the disclosure describes certain shaft configurations and geometries, other configurations and geometries may be possible. Multiple coupling elements 200 may be used to couple multiple shafts, for example.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

What is claimed is:

1. A gas turbine engine having a torque transmission system comprising:
   a transmission shaft substantially coaxially aligned with an engine shaft; and
   a coupling element including a first surface configured to engage a surface of the engine shaft, the coupling element also including a second surface configured to engage a surface of the transmission shaft, to facilitate transmission of torque between the engine shaft and the transmission shaft, the coupling element cooperating with at least one of the engine shaft and the transmission shaft to define at least one fluid passageway between the coupling element and the at least one of the engine shaft and the transmission shaft;
   wherein the first surface of the coupling element is an exterior surface of the coupling element for engaging an interior surface of the engine shaft, and the second surface of the coupling element is an interior surface of the coupling element for engaging an exterior surface of the transmission shaft.

2. The gas turbine engine of claim 1, wherein the coupling element comprises at least one spline for engaging the at least one of the engine shaft and the transmission shaft, and the at least one fluid passageway is defined between a tip of the at least one spline and the at least one of the engine shaft and the transmission shaft.

3. The gas turbine engine of claim 1, wherein the coupling element and the transmission shaft cooperate to define at least one inner fluid passageway between the coupling element and the transmission shaft, and wherein the coupling element and the engine shaft cooperate to define at least one outer fluid passageway between the coupling element and the engine shaft.

4. The gas turbine engine of claim 1, wherein the coupling element comprises a reservoir for receiving fluid, the reservoir being in fluid communication with the at least one fluid passageway.

5. The gas turbine engine of claim 4, further comprising a fluid source for providing fluid into the reservoir.

6. The gas turbine engine of claim 1, further comprising a fluid dam for sealing an end of the coupling element and redirecting fluid flow from the at least one fluid passageway.

7. The gas turbine engine of claim 1, wherein the at least one of the engine shaft and the transmission shaft defines at least one fluid outlet in fluid communication with the at least one fluid passageway for draining fluid from the torque transmission system.

8. The gas turbine engine of claim 7, wherein the at least one fluid outlet is calibrated to meter fluid flow through the at least one fluid passageway.

9. The gas turbine engine of claim 1, wherein the coupling element comprises a flexible and electrically non-conductive material.

10. The gas turbine engine of claim 1, wherein the coupling element comprises a polymer material.

11. The gas turbine engine of claim 1, wherein the coupling element has a hollow cylindrical shape.

12. The gas turbine engine of claim 1, wherein the transmission shaft defines an interior axial fluid passageway therethrough.

13. A gas turbine engine having a coupling element for coupling a first shaft to a second shaft, the second shaft being substantially axially aligned with the first shaft, the coupling element provided with an exterior surface that engages an opposing interior surface of the first shaft and an interior surface that engages an opposing exterior surface of the second shaft to facilitate torque transfer between the first shaft and the second shaft when rotated together, wherein the coupling element and at least one of the first and second shafts cooperate to define at least one fluid passageway therebetween.

14. A method of cooling a coupling element between two substantially axially aligned shafts in a gas turbine engine, the method comprising:
  providing the coupling element coaxially positioned between the two shafts, an exterior surface of the coupling element engaging an interior surface of a first of the two shafts and an interior surface of the coupling element engaging an exterior surface of a second of the two shafts, at least one fluid passageway being defined between the coupling element and at least one of the two shafts; and
  introducing fluid into an end of the at least one fluid passageway, the fluid being caused to centrifugally flow along the at least one fluid passageway due to rotation of the two shafts.

15. The method of claim 14 wherein at least one inner fluid passageway is defined between the interior surface of the coupling element and the exterior surface of the second of the two shafts, and at least one outer fluid passageway is defined between the exterior surface of the coupling element and the interior surface of the first of the two shafts, and wherein the fluid is caused to centrifugally flow along the at least one inner fluid passageway in a first direction and is caused to flow along the at least one outer fluid passageway in a second opposing direction.

16. The method of claim 14 wherein the fluid is a cooling and lubricating fluid.

17. The method of claim 14 wherein the two shafts comprise an engine shaft and a transmission shaft of an aircraft engine.

18. The method of claim 14 wherein the coupling element comprises a flexible and electrically non-conductive material.

\* \* \* \* \*